United States Patent [19]

Kabumoto et al.

[11] Patent Number: 5,458,832
[45] Date of Patent: Oct. 17, 1995

[54] METHOD FOR MANUFACTURING A FOAMED PLASTICS OF SATURATED POLYESTER USING A CYCLIC TETRAMER AS FOAMING AGENT

[75] Inventors: Akira Kabumoto; Kiyoshi Nakayama; Masayasu Ito; Satoshi Ono; Naoki Yoshida, all of Tokyo, Japan

[73] Assignee: The Furukawa Electric Co., Ltd., Tokyo, Japan

[21] Appl. No.: 177,614

[22] Filed: Jan. 5, 1994

[30] Foreign Application Priority Data

Jan. 8, 1993 [JP] Japan ........................................ 5-1521

[51] Int. Cl.⁶ .................................................. B29C 44/50
[52] U.S. Cl. .................................................. 264/53; 264/51
[58] Field of Search .................... 264/50, 51, 53, 264/54

[56] References Cited

U.S. PATENT DOCUMENTS

| | | | |
|---|---|---|---|
| 3,095,258 | 6/1963 | Scott | 425/467 |
| 3,882,055 | 5/1975 | Koerner et al. | |
| 4,164,603 | 8/1979 | Siggel et al. | 264/53 |
| 4,284,596 | 8/1981 | Inokuchi et al. | 264/50 |
| 4,562,022 | 12/1985 | Li et al. | 264/54 |
| 4,616,042 | 10/1986 | Avakian | |
| 4,626,390 | 12/1986 | Li et al. | 264/54 |
| 4,728,472 | 3/1988 | Windley | 264/53 |
| 4,981,631 | 1/1991 | Cheung et al. | 264/50 |
| 5,128,202 | 7/1992 | Subramanian et al. | 264/53 |
| 5,234,640 | 8/1993 | Amano et al. | 264/54 |

OTHER PUBLICATIONS

Japanese Patent Application Kokai Publication No. 4–70321, Mar. 5, 1992.
Japanese Patent Application Kokai Publication No. 2–49039, Feb. 19, 1990.

*Primary Examiner*—Allan R. Kuhns
*Attorney, Agent, or Firm*—John P. White

[57] ABSTRACT

In manufacturing a foamed plastics of a saturated polyester resin, in which a saturated polyester resin is melted in an extruder, a foaming agent is injected under pressure into the molten saturated polyester resin at an intermediate portion of a barrel of the extruder, and the molten saturated polyester resin containing the foaming agent is extruded from a die to manufacture the foamed plastics of the saturated polyester resin, a polydimethylsiloxane having a boiling point, which is lower by at least 50° C. than the melting point of the saturated polyester resin to be foamed, at the atmospheric pressure is used as a foaming agent.

7 Claims, No Drawings

METHOD FOR MANUFACTURING A FOAMED PLASTICS OF SATURATED POLYESTER USING A CYCLIC TETRAMER AS FOAMING AGENT

BACKGROUND OF THE INVENTION

1. Field of the Invention

The present invention relates to a method for manufacturing a foamed plastics of saturated polyester suitable as a material such as a heat-retaining material or a heat-insulating material.

2. Description of the Related Art

Various methods have been developed as a method for manufacturing a foamed plastics of saturated polyester. In particular, polyethylene terephthalate, polybutylene terephthalate, and the like are excellent in heat resistance and mechanical characteristics, and the development of foams using these materials has been under way.

For example, Jpn. Pat. Appln. KOKAI Publication No. 4-70321 describes a method using an inorganic gas having a boiling point of −50° C. or less as a foaming agent in extruding and foaming a thermoplastic polyester resin. Examples of the inorganic gas are nitrogen, carbon dioxide, helium, neon, krypton, and xenon.

Jpn. Pat. Appln, KOKAI Publication No. 2-49039 describes a method using an inert gas, a saturated aliphatic hydrocarbon, a saturated alicyclic hydrocarbon, an aromatic hydrocarbon, a halogenated hydrocarbon, an ether, a ketone, or the like as a foaming agent in extruding and foaming a polyester resin. Examples of the foaming agent are carbon dioxide, nitrogen, methane, ethane, n-butane, isobutane, n-pentane, isopentane, neopentane, n-hexane, 2-methylpentane, 3-methylpentane, 2,2-dimethylbutane, 2,3-dimethylbutane, methylcyclopropane, cyclopentane, 1,1-dimethylcyclopropane, cyclohexane, methylcyclopentane, ethylcyclobutane, 1,1,2-trimethylcyclopropane, benzene, trichloromonofluoromethane, dichlorofluoromethane, monochlorodifluoromethane, trichlorotrifluoroethylene, dichlorotetrafluoroethylene, dimethyl ether, 2-ethoxy-ethanol, acetone, ethyl methyl ketone, and acetyl acetone.

When the above foaming agents are used in extrusion and foaming, the following problems are posed.

(1) An inert or inorganic gas such as carbon dioxide, nitrogen, helium, neon, krypton, or xenon tends to dissipate from the resin. To prevent the gas from dissipating from the resin, the melt viscosity of the saturated polyester resin must be increased. For this purpose, a special additive is used. For example, Jpn. Pat. Appln. KOKAI Publication No. 2-49039 proposes the use of diglycidyl phthalate and a Group I or II metal of the Periodic Table or a compound thereof as such a special additive to improve the melt viscoelasticity of the thermoplastic polyester resin.

(2) When a low-molecular compound of a saturated aliphatic hydrocarbon, a saturated alicyclic hydrocarbon, or an aromatic hydrocarbon, e.g., methane, ethane, propane, n-butane, or isobutane having a boiling point equal to or lower than room temperature at the atmospheric pressure is used, flash ignition and explosion tend to occur in injecting these gases into an extruder because these gases have low boiling points. For this reason, an anti-explosion equipment for the extruder and its periphery is required to result in an increase in installation cost. Problem (1) also occurs in use of these gases.

(3) Compounds having boiling points higher than room temperature at the atmospheric pressure, among saturated aliphatic hydrocarbons, saturated alicyclic hydrocarbons, and aromatic hydrocarbons, such as n-pentane, isopentane, neopentane, n-hexane, 2-methylpentane, 3-methylpentane, 2,2-dimethylbutane, 2,3-dimethylbutane, methylcyclopropane, cyclopentane, 1,1-dimethylcyclopropane, cyclohexane, methylcyclopentane, ethylcyclobutane, 1,1,2-trimethylcyclopropane, benzene, dimethyl ether, 2-ethoxy ethanol, acetone, ethyl methyl ketone, and acetyl acetone have an advantage in that the compounds tend not to easily dissipate from a thermoplastic resin during extrusion and foaming. When these foaming agents, however, are used, the expansion ratio can hardly be increased.

(4) Halogenated hydrocarbons, and particularly, chlorine-containing halogenated hydrocarbons such as trichloromonofluoromethane, dichlorofluoromethane, monochlorodifluoromethane, trichlorotrifluoroethylene, and dichlorotetrafluoroethylene are recognized as materials which destroy the ozone layer. Therefore, use of these organic compounds tends to be forbidden in recent years.

As described above, the conventional methods pose problems of flame explosion of a foaming agent, environmental pollution, or necessity of improvements of viscoelastic properties of a saturated polyester resin.

SUMMARY OF THE INVENTION

It is an object of the present invention to provide a method for manufacturing a high-quality foamed plastics of saturated polyester, free from problems of flame explosion of a foaming agent, environmental pollution, and necessity of improvements of viscoelastic properties of the saturated polyester resin.

A method for manufacturing a foamed plastics of a saturated polyester resin according to the present invention, in which a saturated polyester resin is melted in an extruder, a foaming agent is injected under pressure into the molten saturated polyester resin at an intermediate portion of a barrel of the extruder, and the molten saturated polyester resin containing the foaming agent is extruded from a die to manufacture the foamed plastics of the saturated polyester resin, is characterized in that the foaming agent is a polydimethylsiloxane having a boiling point, which is lower by at least 50° C. than a melting point of the saturated polyester resin to be foamed, at an atmospheric pressure.

The present inventors have made extensive studies to solve the conventional problems described above and have unexpectedly found that polydimethylsiloxane can be used as a foaming agent. Polydimethylsiloxane is a so-called silicone oil and is generally known as a defoaming agent. Moreover, because the resin tends to slip in the extruder for manufacturing a foamed plastics in the presence of polydimethylsiloxane, use of polydimethylsiloxane is generally regarded to be not preferable. Of course, there are no prior arts using polydimethylsiloxane as a foaming agent.

According to the present invention, polyethylene terephthalate or polybutylene terephthalate can be used as the saturated polyester resin. In particular, polyethylene terephthalate can be preferably used. Known additives such as an antioxidant, an antistatic agent, an ultraviolet inhibitor, a pigment, a dye, and a lubricant may be added to these resins within a range which does not impair the object of the present invention. An inorganic compound such as talc, mica, or silica; a metal salt of a polymer compound or an organic compound having a carboxylic group; or a modified polyolefin obtained by adding a modifier to polyolefin may be added as a crystallization nucleating agent or a crystallization accelerator.

According to the present invention, a polydimethylsiloxane used as a major foaming agent has a boiling point, which is lower by at least 50° C. than the melting point of the saturated polyester resin to be foamed, at the atmospheric pressure. For example, a polydimethylsiloxane having a boiling point of 205° C. or less at the atmospheric pressure is preferably used for a polyethylene terephthalate having a melting point of 255° C.

A polydimethylsiloxane containing, as a major component, a cyclic tetramer represented by the following formula (1) (Toshiba Silicone, tradename: TSF404, boiling point: 173° C.; or Toray Dow Corning Silicone, tradename: SH244, boiling point: 174° C.) or a linear polydimethylsiloxane (Toray Dow Corning Silicone, tradename: SH200-1, boiling point: 149° C.) represented by the following formula (2) is preferably used as this polydimethylsiloxane. These polydimethylsiloxanes are safe and nontoxic as may be seen from the fact that they are used in cosmetics. Other foaming agents in addition to these polydimethylsiloxanes may be added within a range which does not impair the object of the present invention.

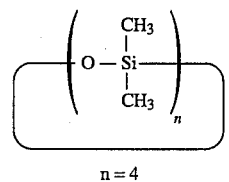

(1)

$n = 4$

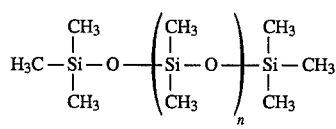

(2)

where, n is 0 or an integer of 1 or more.

According to the present invention, the boiling point of the polydimethylsiloxane used as a foaming agent is set lower by at least 50° C. than the melting point of the saturated polyester resin due to the following reason. The polydimethylsiloxane injected in an extruder barrel under pressure and mixed and dispersed in the molten resin. When the resin is extruded from a die thereby being released from the pressure, cells are assumed to be formed by a boiling and evaporating force of the polydimethylsiloxane. Therefore, if the boiling point of the polydimethylsiloxane is not lower enough, particularly not lower by at least 50° C. than the melting point of the saturated polyester resin, cells are not sufficiently formed.

The viscosity of the polydimethylsiloxane at 25° C. is preferably 5 cSt or less. If the viscosity exceeds 5 cSt, dispersion of the polydimethylsiloxane in the resin is hindered to fail to obtain a high-quality foamed plastics. The viscosity of the polydimethylsiloxane at 25° C. is more preferably 3 cSt or less.

The polydimethylsiloxane is injected into the molten saturated polyester resin at an intermediate portion of the extruder by a constant-pressure injection pump. In this case, the polydimethylsiloxane is injected such that the pressure of the polydimethylsiloxane at an injection portion is 10 kg/cm$^2$ or more but is equal to or lower than a resin pressure at the distal end of the screw. When the pressure is less than 10 kg/cm$^2$, the polydimethylsiloxane cannot be sufficiently dispersed in the resin to fail to obtain a high-quality foamed plastic. When the pressure is higher than the resin pressure at the distal end of the screw, the polydimethylsiloxane is sprayed from the die, thus failing to produce a foamed plastics and endangering the working environments.

A T-die or a circular die is used as the die. A foamed plastics in a shape of sheet or pipe is formed in accordance with the shape of the die.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The present invention will be described by way of the examples below.

Example 1

Polyethylene terephthalate (UNITIKA LTD., tradename: SA1206, melting point: 255° C.) dehumidified and dried at 160° C. for four hours and 3 wt % of talc (Nihon Talc, tradename: Microace K-1) with respect to the dried resin were supplied to an extruder having a diameter of 50 mm. The temperature of the feed zone of the extruder, the temperature of a compression zone, the temperature of a metering zone, and the die temperature were set to 260° C., 275° C., 280° C., and 275° C., respectively. The screw rotation speed was set to 40 rpm. polydimethylsiloxane (Toshiba Silicone, tradename: TSF404, boiling point: 173° C., viscosity: 2.5 cSt) as a foaming agent containing a cyclic tetramer as a major component was injected by a constant-pressure injection pump such that the pressure of the injection portion was set to 50 kg/cm$^2$. The resin was extruded from the T-die into air. An extruded sheet was rapidly cooled to the glass transition temperature (68° C.) or less of the resin and was wound up.

The resultant foamed plastics of polyethylene terephthalate was a high-quality foamed plastics having uniform fine cells, an average cell size of 100 µm, and an expansion ratio of 3.5.

Example 2

A foamed plastics of polyethylene terephthalate was obtained following the same procedures as in Example 1 except that linear polydimethylsiloxane (Toray Dow Corning Silicone, tradename: SH200-1, boiling point: 149° C., viscosity: 1 cSt) was used as a foaming agent. The resultant foamed plastics was a high-quality foamed plastics having uniform fine cells, an average cell size of 90 µm, and an expansion ratio of 2.8.

Comparative Example 1

Extrusion molding was performed following the same procedures as in Example 1 except that linear polydimethylsiloxane (Toray Dow Corning Silicone, tradename: SH200-2, boiling point: 228° C., viscosity: 2 cSt) was used as a foaming agent. No foaming was observed.

Comparative Example 2

A foamed plastics of polyethylene terephthalate was obtained following the same procedures as in Example 1 except that carbon dioxide was injected at 55 kg/cm² as a foaming agent. The resultant foamed plastics was a nonuniform foamed plastics having an expansion ratio of 1.3 although the average cell size was about 200 μm.

As has been described above, according to the method of the present invention, since a polydimethylsiloxane suitable for growth of cells in a saturated polyester resin is used as a foaming agent, a high-quality foamed plastics in which fine cells are uniformly dispersed can be obtained without improving the viscoelastic properties of the resin. In addition, this foaming agent is safe and nontoxic and therefore can be suitably used from the viewpoint of environmental sanitation. As described above, the method of the present invention provides great industrial advantages.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for manufacturing a foamed plastics of a saturated polyester resin, comprising:

melting the saturated polyester resin in an extruder;

injecting a polydimethylsiloxane as a foaming agent to molten polyester resin from an intermediate portion of a barrel of the extruder, polydimethylsiloxane consisting essentially of, as a major component, a cyclic tetramer represented by the following formula (1):

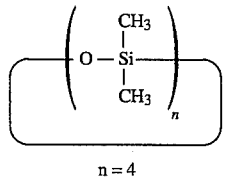

(1)

$n = 4$ and having a boiling point, which is lower by at least 50° C. than a melting point of the polyester resin to be foamed, at an atmospheric pressure; and extruding the molten polyester resin containing the foaming agent from a die to manufacture the foamed plastics of the polyester resin.

2. A method according to claim 1, wherein the saturated polyester resin is polyethylene terephthalate.

3. A method according to claim 1, wherein the saturated polyester resin contains talc.

4. A method according to claim 1, wherein the polydimethylsiloxane has a viscosity of not more than 5 cSt at 25° C.

5. A method according to claim 1, wherein the boiling point of the polydimethylsiloxane at an atmospheric pressure is not more than 200° C.

6. A method according to claim 1, wherein a pressure for injecting the polydimethylsiloxane in the molten saturated polyester resin from the intermediate portion of the extruder falls within a range of not less than 10 kg/cm² to not more than a resin pressure at a distal end of a screw.

7. A method for manufacturing a foamed plastics of polyethylene terephthalate, comprising:

melting the polyethylene terephthalate in an extruder;

injecting a polydimethylsiloxane as a foaming agent to the molten polyethylene terephthalate from an intermediate portion of a barrel of the extruder under pressure in a range of not less than 10 kg/cm² to not more than a resin pressure at a distal end of a screw, the polydimethylsiloxane consisting essentially of, as a major component, a cyclic tetramer represented by the following formula (1):

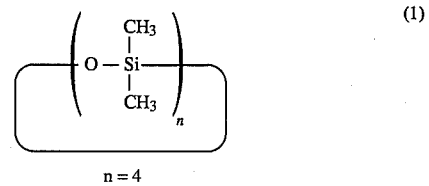

$n = 4$ and having a boiling point of not more than 200° C. at an atmospheric pressure; and extruding the molten polyethylene terephthalate containing the foaming agent from a die to manufacture the foamed plastics of polyethylene terephthalate.

* * * * *